(12) United States Patent
Schaefer et al.

(10) Patent No.: US 10,479,072 B2
(45) Date of Patent: Nov. 19, 2019

(54) METHOD FOR DECORATING SUBSTRATES AND DECORATED SUBSTRATE

(71) Applicant: Marabu GmbH & Co. KG, Tamm (DE)

(72) Inventors: Wolfgang Schaefer, Bietigheim-Bissingen (DE); Markus Rodrigo-Fuentes, Lauffen am Neckar (DE); Martin Hehl-Heinz, Oetzingen (DE)

(73) Assignee: Marabu GmbH & Co. KG, Tamm (DE)

( * ) Notice: Subject to any disclaimer, the term of this patent is extended or adjusted under 35 U.S.C. 154(b) by 574 days.

(21) Appl. No.: 15/029,400

(22) PCT Filed: Oct. 1, 2014

(86) PCT No.: PCT/EP2014/071091
§ 371 (c)(1),
(2) Date: Apr. 14, 2016

(87) PCT Pub. No.: WO2015/055437
PCT Pub. Date: Apr. 23, 2015

(65) Prior Publication Data
US 2016/0243814 A1    Aug. 25, 2016

(30) Foreign Application Priority Data
Oct. 15, 2013    (DE) .......................... 10 2013 111 378

(51) Int. Cl.
*B41M 7/00* (2006.01)
*B41F 17/30* (2006.01)
(Continued)

(52) U.S. Cl.
CPC .............. *B41F 17/30* (2013.01); *B41F 15/02* (2013.01); *B41F 15/0877* (2013.01);
(Continued)

(58) Field of Classification Search
CPC .................................................. B41M 7/0081
See application file for complete search history.

(56) References Cited

U.S. PATENT DOCUMENTS

| | | | |
|---|---|---|---|
| 4,012,552 A * | 3/1977 | Watts | ....................... B41M 3/12 156/233 |
| 5,391,247 A | 2/1995 | Kamen et al. | |

(Continued)

FOREIGN PATENT DOCUMENTS

| | | |
|---|---|---|
| DE | 198 17 193 | 10/1999 |
| DE | 69518016 | 3/2001 |

(Continued)

OTHER PUBLICATIONS

International Application No. PCT/EP2014/071091 search report dated Mar. 12, 2015.

*Primary Examiner* — Elizabeth A Burkhart
(74) *Attorney, Agent, or Firm* — Bachman & LaPointe, PC

(57) ABSTRACT

A method for decorating substrates, in particular packaging, comprising the steps: printing at least one first decorative pattern (2) on the substrate using a first radiation-curable, preferably UV-curable, printing ink composition (3); printing at least one second decorative pattern (4), using a second radiation-curable, preferably UV-curable, printing ink composition (5), on at least part of the substrate (1) in a region near to the first pattern (2), chronologically before, after, or during the printing of the first pattern; radiation curing of the first and second printing ink compositions (3, 5), preferably directly after the printing of each pattern, the radiation-cured second printing ink composition having a lower glass transition temperature than the radiation-cured first printing ink composition; application of a decorative coating to the second pattern by means of a hot foil stamping process, a hot stamping foil comprising a decorative coating material being (Continued)

pressed against the printed substrate by means of a stamping tool under the application of heat and pressure such that the decorative coating adheres to the second pattern but not to the first pattern.

20 Claims, 1 Drawing Sheet

(51) Int. Cl.
| | |
|---|---|
| *B44C 1/17* | (2006.01) |
| *B41M 1/14* | (2006.01) |
| *B41F 15/08* | (2006.01) |
| *B41F 19/02* | (2006.01) |
| *B41F 23/00* | (2006.01) |
| *C03C 17/32* | (2006.01) |
| *B41F 15/02* | (2006.01) |
| *B41M 1/24* | (2006.01) |
| *B41M 1/18* | (2006.01) |
| *B41M 1/20* | (2006.01) |
| *B41M 1/40* | (2006.01) |

(52) U.S. Cl.
CPC ............ B41F 19/02 (2013.01); B41F 23/005 (2013.01); B41M 1/14 (2013.01); B41M 7/00 (2013.01); B41M 7/0081 (2013.01); B44C 1/1729 (2013.01); C03C 17/32 (2013.01); *B41M 1/18* (2013.01); *B41M 1/20* (2013.01); *B41M 1/24* (2013.01); *B41M 1/40* (2013.01); *B41P 2219/00* (2013.01); *B41P 2219/43* (2013.01); *C03C 2217/72* (2013.01)

(56) References Cited

U.S. PATENT DOCUMENTS

| | | | |
|---|---|---|---|
| 5,520,973 A | 5/1996 | Kamen et al. | |
| 5,585,247 A | 12/1996 | Habenstein | |
| 5,656,336 A * | 8/1997 | Kamen | B41M 1/34 427/511 |
| 6,395,120 B1 | 5/2002 | Bradbury-Harris et al. | |
| 6,479,563 B1 | 11/2002 | Liebing et al. | |
| 8,835,530 B2 | 9/2014 | Schaefer | |
| 2007/0054088 A1* | 3/2007 | Matijasic | C09J 133/06 428/123 |
| 2007/0154632 A1* | 7/2007 | Schaefer | C03C 17/326 427/162 |
| 2008/0032070 A1 | 2/2008 | Hirschfelder et al. | |

FOREIGN PATENT DOCUMENTS

| | | |
|---|---|---|
| DE | 199 51 404 | 5/2001 |
| DE | 10 2004 041 868 | 3/2006 |
| EP | 0 626 354 | 11/1994 |
| EP | 1 469 036 | 10/2004 |
| EP | 1 806 327 | 7/2007 |
| GB | 2 353 532 | 2/2001 |
| JP | 57-152992 | 9/1982 |
| JP | 59-184746 | 10/1984 |

* cited by examiner

METHOD FOR DECORATING SUBSTRATES AND DECORATED SUBSTRATE

BACKGROUND OF THE INVENTION

The invention relates to a method for decorating substrates, more particularly packaging made from unlacquered or lacquered glass, plastic, paper, or cardboard, and also to a decorated substrate produced preferably by such a method.

To decorate, for example, drinking glasses or glass bottles, it is known practice to print them, particularly by a screen printing process, with UV-curable glass printing inks. In this case it is possible to print different-colored printing inks at a number of printing stations arranged in series, in order thus to generate an overall printing image which is composed of different printed patterns. In the printing of glass it is critical to achieve effective adhesion and scratch resistance, chemical resistance, and wet adhesion of the printed pattern. Very good results in this context can be obtained with UV-curable glass printing inks and glass print varnishes from the applicant, in accordance with EP 1 806 327 B1. For the chromatic hues (yellow, orange, red, blue, and green) and also for black and white, very brilliant shades can be achieved. Metallic shades are produced typically from bronzes (silver metallic from aluminum bronzes, gold from CuZn, bronzes and colored metallic bronzes by overcoating with high-transparency chromatic colors such as yellow or red, for example, etc. A disadvantage here for the beverage and cosmetics industries is the inadequate brilliance of the printed metallic shades. Nowadays, therefore, for the decoration of drinking glasses of high-quality appearance, "ceramic printing inks" (known as bright precious metal preparations; see Technical Information No. 1.4/4 from e.g. W. C. Heraeus, Heraeusstrasse 12-14, D-62540 Hanau), which exhibit extremely high brilliance after stoving, continue to be used. Disadvantages of these "ceramic printing inks" are the very high price due to the use of precious metals, the high temperatures (400-700° C.) needed for the stoving operation, and the cost and inconvenience of monitoring the stoving operation. Alternatively it is also possible to use thermoplastic bright precious metal preparations and decorative colors (see Technical Information No. 1.22/4 from W. C. Heraeus). A disadvantage of these systems is that the thermoplastic bright precious metal preparations and decorative colors are solid at room temperature and must be heated before printing to around 65-75° C. so that they become printable. In addition, they also still possess all of the disadvantages mentioned for the "ceramic inks".

With increasing frequency, therefore, substrates, and especially glass bottles, have been decorated using a hot stamping process, for which purpose a hot stamping foil is pressed under pressure and temperature against the substrate. Hot stamping using hot stamping foils is much more economic than the above processes, and provides highly bright coatings virtually comparable with the bright precious metal preparations. Temperatures utilized for hot stamping in the prior art are between 220° C. and 300° C., in order to ensure optimum transfer of the hot stamping foil to the UV-curing glass printing ink or glass print varnish, respectively.

The hot stamping foil here generally comprises, on a side facing the substrate, a heat-activated bonding layer, on which is located in turn the decorative coating to be applied by stamping. Located between the decorative coating and a backing foil, as for example a polyester foil, of the hot stamping foil there is a release layer to facilitate detachment of the backing foil from the stamped coating after the end of the stamping procedure.

In the case in particular of direct stamping onto glass substrates, the adhesion of the decorative coating or of the heat-activated bonding layer of the hot stamping foil is not sufficient for industrial applications.

Disclosed for this purpose has been the application to the glass substrate, first of all, of what is called an adhesive printing ink in the form of a pattern, onto which the decorative coating is then stamped. Processes of this kind are described for example in EP 06 263 54 B1 (Kamen et al.) and in the Japanese patent publications it cites, No. JP-A 59 184 746 and No. JP-A 57 152 992. A disadvantage of EP 06 263 54 B1 is that, with the processes set out therein, the printing inks do not adhere to the glass substrate to the degree required for commercial purposes (see also DE 695 18 016 T2 from Kamen et al., section 3). With regard to other known, printable adhesive inks as adhesion promoter layer between glass substrate and hot stamping foil, reference is made, for example, to U.S. Pat. No. 5,391,247 A and also to U.S. Pat. No. 5,585,153 A. Latter adhesive inks are radiation-curable. With these known adhesive printing inks there is the problem of low reactivity (examples 1, 2 and 4), a comparatively low scratch resistance, and a comparatively low chemical resistance, for the case, for instance, where hot stamping is to be applied to perfume bottles or cosmetics bottles.

A further problem exists with these processes if complicated decorations are desired which are to have not only a hot-stamped coating but also a printed pattern, as for example a colored printed pattern, adjacently, i.e., in a region adjacent to the coating. In order to avoid the hot stamping foil or decorative coating thereon adhering to all of the printed patterns, it will be necessary, in order to obtain a correspondingly complicated decoration, to use hot stamping dies whose peripheral contour would have to match the contour of the coating to be stamped, in order to prevent the hot stamping foil from being pressed against printed patterns that were not to be stamped. The use of so-called continuous stamping processes, operating with a rotating stamping roll, would not be possible without stamping all of the printed patterns. The use of stamping dies is disadvantageous, however, for a number of reasons. For instance, a dedicated die must be produced and used for each form of coating to be stamped. Furthermore, the operation of hot stamping using a stamping die is slower and more costly.

DE 199 51 404 A1 discloses a method for producing the cover plate of an illuminated advertising unit. For this purpose, first of all, a color pattern is printed onto a substrate, and a high-transparency clear varnish is applied congruently to this pattern. In a subsequent step, a stamping foil is applied by stamping, this foil not adhering to the clear varnish, thus resulting in an overall image which consists of the stamping foil and of the regions left blank over the clear varnish.

DE 10 2004 041 868 B3 describes a transfer foil for in-mold labeling processes, the transfer foil having structural elements for the three-dimensional structuring of injection-molded parts.

SUMMARY OF THE INVENTION

Starting from the above-stated prior art, the problem addressed by the invention is that of specifying a method for decorating substrates, more particularly three-dimensional substrates, with which it is possible to generate on a substrate a decorative image which, alongside pattern sections, more particularly colored pattern sections, in other words to be printed adjacently, has decorative, hot-stamped coating sections, the intention being that the method should feature high speed and that the use of customarily vertically adjustable printing dies is preferably avoided. At the same time, the stamped decoration is to be notable preferably for high scratch resistance and/or chemical resistance. A further problem addressed is that of specifying a corresponding optimized, decorated substrate.

This problem is solved in terms of the method and in terms of the substrate by the features disclosed herein.

Advantageous developments of the invention are specified herein, and in the dependent claims. The scope of the invention embraces all combinations of at least two features disclosed in the description, in the claims and/or in the figures. In order to avoid repetition, the intention is that features disclosed in accordance with apparatus should be held to be in accordance with method, and claimable as such. Similarly, the intention is that features disclosed in accordance with method should be held to have been disclosed in accordance with apparatus, and claimable as such.

The invention was based on the concept of printing a substrate with at least one first decorative pattern, with a first radiation-curable, preferably UV-curable (alternatively, for example, electron-beam-curable), printing ink composition, the first decorative pattern being intended to still be visible after completion of the overall decorating process, more particularly visible on the outside of the substrate.

A printing ink composition in this context refers both to pigment-containing systems, i.e., colored systems, and to pigment-free systems, i.e. lacquers or varnishes. The term "printing ink composition" is therefore used as a generic term for inks and colors and for varnishes and lacquers.

It is also possible for a plurality of such decorative patterns to be applied by printing, these patterns being composed of radiation-curable printing ink compositions, more particularly different-colored radiation-curable printing ink compositions, and being distinguished by being not intended for overstamping. Further, at least one second decorative pattern is applied to the substrate, with a second radiation-curable, preferably UV-curable (alternatively, for example, electron-beam-curable), printing ink composition, specifically, in relation to the overall decoration, at least regionally or at least sectionally in a region adjacent to the first pattern. The printing sequence here is in principle arbitrary—that is, the second pattern may also be printed before the first pattern. A feature of the at least one second decorative pattern is that it is to be overstamped in a later hot stamping step with a decorative coating, more particularly in the contour of the second pattern.

The purpose of the feature of the at least sectional arrangement of the second decorative pattern adjacent to the first pattern is to ensure that the first pattern, at least partly, remains visible as such even after the hot stamping operation (as well as the hot stamping, i.e., the stamped decorative coating). It is of course possible to print a plurality of second decorative patterns, which in that case are each overstamped, in particular in a joint stamping step.

In accordance with the invention the secondarily decorative pattern has the primary function of an adhesion promoter or an adhesive color which at high production rates (2400-7200 cycles/h) exhibits on the one hand good adhesion, high scratch resistance and chemical resistance and on the other hand a higher affinity, in the hot stamping operation, to the hot stamping foil than to the at least one first decorative pattern.

Before the hot stamping step, the printed patterns are radiation-cured, more particularly UV-cured through the use of undoped or doped mercury vapor lamps or LED lamps, it being particularly preferred for the pattern just printed to be radiation-cured after the printing of one pattern and before the printing of the further pattern. Also conceivable, however, is a joint radiation-curing of at least two patterns, more particularly all of the patterns, ahead of the hot stamping step.

In accordance with the invention there is now further provision for the glass transition temperature of the radiation-cured second printing ink composition, i.e., of the second pattern, to be stamped later on, to differ from the glass transition temperature of the first radiation-cured printing ink composition, i.e., of the first decorative pattern, specifically such that the glass transition temperature of the second radiation-cured printing ink composition is lower than that of the first radiation-cured printing ink composition, in order thereby to ensure that, with an appropriately adjusted hot stamping temperature of the stamping tool, the second decorative pattern softens before the first decorative pattern. The glass transition temperature here is the temperature at which wholly or partly amorphous polymers undergo transition from a glasslike or hard-elastic, comparatively brittle state into a flexible, liquid or rubber-elastic state. The glass transition temperature is determined preferably by differential scanning calorimetry (DSC). In this method, the heat capacity is captured as a function of the temperature.

The glass transition temperature is suitably lowered using, for example, heat-activatable pressure-sensitive adhesives based on UV-crosslinking polymers/monomers, of the kind sold, for example, by the companies Kiwo Kissel+Wolf GmbH, Collano Adhesives AG, Novamelt GmbH, and Panacol-Elosol GmbH. Especially suitable in this context are Kiwoprint UV 85 and Kiwoprint UV 92, although other screen-printable pressure-sensitive UV adhesives can also be used for lowering the glass transition temperature.

Another possibility is to use UV-crosslinkable polyacrylate such as, for example, the acResin UV products from BASF, which consist of acrylic copolymers and contain a copolymerized photoreactive group. Optionally it is possible to add additional additives to the substrate-specific colors or lacquers, preferably additionally an oligomer with UV-crosslinkable functional groups which are reactive with the polyacrylate, as is described in EP 1 469 036 B1, for example. A composition formed as described therein is preferably admixed to a corresponding base composition (customary, substrate-specific color or lacquer) which is tailored specifically to the substrate.

DE 198 17 193 B4 describes a radiation-curable and/or heat-curable pressure-sensitive adhesive based on a difunctional acryloylated aromatic polyurethane in combination with 2-hydroxylpropyl acrylate/methacrylate. Both EP 1 469 036 B1 and DE 198 17 193 B4 are intended to be disclosed as belonging to the invention with regard to the embodiment of a heat-activatable pressure-sensitive adhesive.

Then, through application of pressure and temperature, a hot stamping foil is pressed onto the substrate printed as above or against the first and second patterns, this hot stamping foil comprising not only the decorative coating material to be applied by stamping but also, preferably, a backing foil, as for example a polyester foil. Located preferably between coating material and backing foil is a release layer. More preferably, on the outside, on the coating material, there is located an adhesion promoter layer, more particularly a heat-activated bonding layer, in order to fix the coating material on the second pattern during hot stamping.

The pressure is applied by means of a stamping tool, more particularly by means of a rotating stamping roll; in the hot stamping step, the greater bonding tendency of the second decorative pattern at a given hot stamping temperature means that the coating material adheres only to this second pattern and not to the at least one first decorative pattern, and so, after the hot stamping operation, the first printed pattern remains visible adjacent to the stamped decorative coating. During the stamping procedure, the hot stamping foil experiences an opposing pressure from the substrate or from a backing roll both in the region of the first pattern and in the region of the second pattern.

After stamping has taken place, in particular after a short cooling section, a backing foil, more particularly a polyester foil, of the hot stamping foil is detached from the decorative coating stamped on the second pattern. In a region above the first pattern, coating material remains adhering to the backing foil, owing to a lack of adhesion to the first pattern. The backing foil is preferably wound up.

The coating material used for stamping (hot stamping foil) preferably comprises a metal layer, more particularly an aluminum layer, which gives the stamped foil print a characteristic metallic specular gloss. This metal layer is preferably applied by vapor coating under a high vacuum. The color-determining lacquer layer is present as a high-transparency lacquer over the aluminum layer, and if necessary can also be colorless, in order to leave substantially unchanged the metallic hue of the metal layer, more particularly of the aluminum layer. By giving different coloring to the glazing lacquers that are preferably employed, the different colors of the stamping foils can be used to obtain shades from gold and bronze through saturated, chromatic metallic colors. Very preferably the color-determining lacquer layer of the glazing lacquers used protects the coating material on the completed stamped foil print against mechanical exposure.

The hot stamping foil used is preferably foil GXO from Payer Graphic AG or foil GO from Payer Graphic AG. Alternatively it is possible to use hot stamping foils from CerFoils with the designations 5100, 5200, and 5300 for glass substrates, and also types 1100, 1200, 1300, and 1600 for polyolefin materials. A further alternative is constituted by the hot stamping foils from Technofoil Srl with the designation Silkfoil for 3D metallic effects or Flexfoil for uneven substrate surfaces.

With very particular preference the relevant hot stamping operating parameters of stamping temperature (temperature of the stamping tool, more particularly of a stamping roll) and the pressing time, in other words, in the case of a roll, the speed with which the substrates are transported past the roll, are set in such a way that, during the hot stamping method step, the radiation-cured second printing ink composition of the second pattern, at least in the region of its surface, is heated to a temperature above the glass transition temperature of the radiation-cured second printing ink composition, so that the second printed pattern softens at least in the region of its surface, and at the same time the glass transition temperature of the first printed pattern, i.e., the radiation-cured first printing ink composition, is not reached, so that the first decorative pattern preferably does not soften or at least not to the same extent as the second pattern.

It is particularly preferred if, as already indicated, the stamping tool used is a rotating stamping roll, in order to be able therefore to carry out stamping in a continuous operation, very preferably in a continuous roll-to-roll operation.

The preferred Shore hardnesses of the stamping rolls are preferably between 30-100 Shore, more preferably between 55-70 Shore.

Where a plurality of decorative patterns, more particularly of different-colored decorative patterns, intended to be visible after the stamping operation, are provided, it is preferred for the glass transition temperature of the at least one, preferably only one, second decorative pattern to be lower than, more particularly much lower than, that of the patterns, more particularly different-colored patterns, which are still visible thereafter.

It is especially preferred if the glass transition temperature of the radiation-cured second printing ink composition is at least 10° C., preferably at least 20° C., more preferably at least 30° C., very preferably at least 40° C., more preferably still at least 50° C. lower than the glass temperature of the radiation-cured first printing ink composition (or of any further printed patterns provided that are still visible later).

It is particularly preferred if the stamping temperature of the stamping tool during the hot stamping step onto glass articles is between 80° C. and 250° C., more preferably between 100° C. and 220° C., more preferably still between 120° C. and 180° C. For plastic substrates or paper, temperatures between 80° C. and 220° C. are preferably utilized. The stamping time in this case is set such that the temperature of the second printed pattern rises above its glass temperature, whereas the temperature of the first printed pattern remains below its (higher) glass transition temperature. With particular preference the glass transition temperature of the second printed pattern is between about 20° C. and about 80° C.

A further advantage of the invention is that in comparison to the prior art the hot stamping temperature can be significantly lowered and hence the energy and costs can be reduced. Furthermore, a greater processing window is achieved as a result of the reduction in the hot stamping temperature.

With regard to the specific embodiment of the substrate to be printed, there are different possibilities. This substrate may in principle be two-dimensional, but is preferably three-dimensional and very preferably is a packaging container. The substrate material, at least in the region of its surface to be printed, may for example be unlacquered or lacquered glass, plastic, paper, or cardboard. For attaining particularly good scratch resistance properties it is preferable with particular appropriateness for the printing ink compositions used to be specifically tailored to the substrate in question, in order thereby to adhere particularly well to the substrate.

The glass transition temperature in this case can be reduced in comparison to the customary substrate-specific colors and lacquers, through the addition, for example, of heat-activatable pressure-sensitive adhesives based on UV-crosslinking polymers/monomers. Particularly good experiences have been gained in this context through the addition of Kiwoprint UV 85 and Kiwoprint UV 92 (screen-printable, heat-activatable pressure-sensitive adhesives based on UV-crosslinking polymers/monomers from Kiwo Kissel+Wolf) to a glass printing ink, as described for example in the applicant's EP 1 806 327 B1.

As mentioned, the first and second radiation-curable printing ink compositions should preferably be tailored to the substrate to be printed in order thereby to achieve optimized adhesion. Preferably in this context the second printing ink composition comprises substances, more particularly a heat-activatable pressure-sensitive adhesive based on UV-crosslinking polymers/monomers (hotmelt adhesive component), which adjusts the glass transition temperature to the desired value.

A glass printing ink or a glass print varnish, particularly as a base composition, is notable in particular for a non-crosslinkable polymer based on bisphenol A in solution in a monomer, at least one further resin with functional groups, at least one monomer, additives, and at least one radical photoinitiator.

A plastic color or a plastic lacquer, particularly as a base composition, is notable in particular for oligomers based on epoxy acrylate, urethane acrylate and/or polyester acrylate and also methacrylate, at least one mono- and/or di- and/or trifunctional monomer, additives, and at least one radical photoinitiator.

A paper or cardboard color or a paper or cardboard lacquer, particularly as base composition, is notable in particular for oligomers based on epoxy acrylate and/or urethane acrylate and/or polyester acrylate and also methacrylate and/or butyl methacrylate, at least one mono- and/or difunctional monomer, additives, and at least one radical photoinitiator.

In principle here a color is understood to be a printing ink composition with pigments, and a lacquer is understood to be a pigment-free printing ink composition.

A substrate-specific color as elucidated above is admixed, for the purpose of adjusting the glass transition temperature, with a heat-activatable pressure-sensitive adhesive based on UV-crosslinking polymers/monomers or polymers from the group of the adhesive resins such as, for example, polyacrylates, polyurethane acrylates, and monofunctional acrylate and/or methacrylate monomers.

The glass transition temperature of the second printing ink composition is preferably adjusted by addition of a heat-activatable pressure-sensitive adhesive based on UV-crosslinking polymers/monomers to a base composition, more particularly a substrate-specific base composition, more particularly a glass printing ink (or print varnish), a plastic printing ink (or print varnish), or a paper or cardboard printing ink (or print varnish). The glass transition temperature may be set at the production plant, although it is particularly preferred for the setting of the glass transition temperature to take place not at the production plant of the color or lacquer manufacturer, but instead by the decorator or printer as part of the printing process, and more particularly for it to be performed immediately prior to the printing operation, thus allowing the optimum quantity added for a good print outcome to be determined specifically for one print job on the printing machine.

It has turned out to be very particular if the weight fraction of the heat-activatable pressure-sensitive adhesive based on UV-crosslinking polymers/monomers in the second printing ink composition is between 2% and about 80%, preferably between 10% and 40%, very preferably between 10% and 25%. It follows from this that the remaining weight fraction consists between 75% and 90%, very preferably of the base composition. In the range between 1% and 25%, the surface of the UV-cured second printing ink composition is absolutely tack-free. Testing of the adhesion produces a result of GT0, the scratch resistance is very good and is comparable with the first printing ink composition. The MEK abrasion test with the Taber Abraser likewise produces values which are comparable with the first printing ink composition. In the 24 h water storage test, there are no differences apparent between the first and second printing ink compositions. Amounts of addition of the heat-activatable pressure-sensitive adhesive based on UV-crosslinking polymers/monomers of greater than 25% lead to greater tack of the surface of the cured second printing ink composition, in line with the increasing quantity added. As a result there are reductions in scratch resistance and the chemical resistance, and the values in the MEK abrasion test with the Taber Abraser deteriorate, as do the water storage results. Hot stamping is still entirely possible up to an added quantity of up to 80%.

For the printing of glass substrates in order to achieve particularly high scratch resistance and simultaneous chemical resistance, it has emerged as being particularly advantageous if the base composition for the second printing ink composition—to which a heat-activatable pressure-sensitive adhesive based on UV-crosslinking polymers/monomers is added, more particularly Kiwoprint UV 85 or Kiwoprint UV 92—is formed as a radiation-curable system, more particularly as a UV-curable system. In this case the second base composition preferably comprises at least one radical photoinitiator, but no cationic photoinitiator, and also an epoxy resin based on bisphenol A, in solution in a UV-curable monomer, and also a resin having functional groups, which has free functional hydroxy and/or epoxide and/or acid and/or acid anhydride and/or acrylate groups. The second printing ink composition further preferably comprises a wax. The provision of exclusively radical photoinitiators prevents crosslinking of the epoxy resin based on bisphenol A with the monomers present, with the objective of embedding the epoxy resin (merely) physically into the resulting network matrix. In contrast to cationic photoinitiators, radical photoinitiators do not split the epoxy group of the epoxy resin. Very preferably, moreover, the second base composition comprises no amine hardener, i.e., no aliphatic primary amines/diamines or amine/diamine derivatives and/or cycloaliphatic or aromatic amines/diamines.

A base composition of this kind is admixed preferably with a heat-activatable pressure-sensitive adhesive based on UV-crosslinking polymers/monomers, especially Kiwoprint UV 85 or Kiwoprint UV 92. The weight fraction of the heat-activatable pressure-sensitive adhesive based on UV-crosslinking polymers/monomers in the second, radiation-curable base composition is preferably between 10% to 25%. In order to set the glass transition temperature, moreover, the following heat-activatable pressure-sensitive adhesives based on UV-crosslinking polymers/monomers are contemplated: Novarad RCL 6015 from Novomelt GmbH, and also from Panacol-Elosol GmbH from the Vitralit series, as for example the products UV 2771 and UV 7561, but without being restricted to these.

With regard to example formulas for the embodiment of the base composition, reference is made to EP 1 806 327 B1, which in this respect is intended to be disclosed as belonging to the disclosure content of the present application.

It is particularly appropriate if, furthermore, the wax of the second base composition is selected from the following group: polyethylene wax, modified polyethylene wax, high density polyethylene waxes, polymer-silica compounds, micronized polyolefin waxes, Fischer-Tropsch waxes, micronized polytetrafluoroethylene waxes, micronized polytetrafluoroethylene/polyethylene waxes, amide waxes, carnauba waxes, montan waxes, micronized ester waxes with UV-reactive groups, paraffin waxes, polypropylene waxes, spray-micronized polyolefin waxes.

More preferably the wax is used in an amount of 0.1 wt % to 10 wt % dry weight, preferably 0.5 wt % to 5.0 wt %, more preferably 1.0 wt % to 3.0 wt %, based on the weight of the second printing ink composition.

It has emerged as being particularly appropriate if the epoxy resin of the base composition based on bisphenol A has a weight-average molecular weight in the range between 500 to 1500, more particularly between 700 and 1500.

It is still-further preferred if the resin with the functional groups is a melamine acrylate, an acid-modified polyester acrylate and/or epoxide acrylate.

It is particularly appropriate if the epoxy resin based on bisphenol A is used in an amount of 1 to 90 wt %, preferably 5 to 20 wt %, very preferably 11 to 14 wt % dry weight, based on the weight of the second base composition.

It is still-further preferred if the resin having functional groups is used in an amount of 5 to 90 wt %, preferably 5 to 40 wt %, and more particularly 10 to 30 wt % dry weight, based on the weight of the base composition.

It is especially preferred if the radical photoinitiator or photoinitiators is or are present in a total amount of 1 to 12 wt %, more particularly 3 to 7 wt %, based on the weight of the base composition.

It is particularly appropriate if the UV-curable monomer is hexanediol diacrylate.

Depending on whether the printing ink composition to be produced is to result in a color or a lacquer, pigments may or may not be added to the base composition.

Advantageous embodiments of the base composition have been described above. It is also conceivable for the second radiation-curable printing ink composition to be obtained not by mixing of a (ready-made) base composition with a heat-activatable pressure-sensitive adhesive, more particularly a ready-made heat-activatable pressure-sensitive adhesive, based on UV-crosslinking polymers/monomers. For this case as well it is advantageous if the second radiation-curable printing ink composition has a composition like the base composition, supplemented by at least one component (heat-activatable pressure-sensitive adhesive component) for adjusting the glass transition temperature.

With a view to the printing processes to be employed, there are various possibilities. In principle it is possible to apply the first or second pattern using screen printing, rotary screen printing, flexographic printing, and offset printing.

It is particularly appropriate if the at least one first pattern and the at least one second pattern, more particularly the exclusively one second pattern, are applied to the substrate with a printing apparatus which features a first printing station, more particularly a first screen printing station, for the print application of the first pattern. The first printing station is preferably assigned a radiation-curing unit, more particularly one/or more UV emitters, with which the first pattern can be cured before the second pattern is printed.

The apparatus further comprises a second printing station, arranged before or after the first printing station, more particularly a screen printing station, for the print application and preferably radiation-curing of the second pattern. Furthermore, the apparatus preferably comprises a hot stamping station, more particularly a roll-to-roll stamping station, which has a stamping tool comprising a stamping roller and which is downstream of the printing stations in a substrate conveying direction.

Furthermore, the invention leads to a decorated substrate, more particularly a substrate decorated by a decorating method configured in accordance with the concept of the invention, said substrate comprising more particularly a printed surface of unlacquered and lacquered glass, plastic, paper, or cardboard. The surface of the substrate is provided with a first, decorative, preferably colored printed pattern composed of a radiation-cured printing ink composition. Adjacent to this printing ink composition, i.e., to the first printed pattern, is a hot-stamped decorative coating.

The decorative coating and the substrate enclose between them, in sandwich fashion, a second decorative pattern, which consists of a second radiation-cured printing ink composition, whose glass transition temperature is lower than the glass transition temperature of the radiation-cured first printing ink composition.

It is particularly preferred here if the peripheral contour of the second printed pattern is at least approximately a match to the peripheral contour of the hot-stamped coating.

Especially when stamping glass substrates, more particularly glass bottles, made from a white glass or from a transparent glass—that is, a glass which is at least partly translucent, but optionally not necessarily colored—it may be advantageous if the second printing ink composition has a color which is at least approximately the same as a color of the decorative coating, in order to give the impression that the decorative coating is located directly on the glass substrate, in the event that a view is taken through the glass substrate, from behind, as it were.

BRIEF DESCRIPTION OF THE DRAWINGS

Further advantages, features, and details of the invention will become apparent from the description hereinafter of preferred exemplary embodiments and with reference to the drawings.

The drawings show in.

In the figures, elements that are alike and elements having the same function are labeled with the same reference symbols.

DETAILED DESCRIPTION

Figure 1:
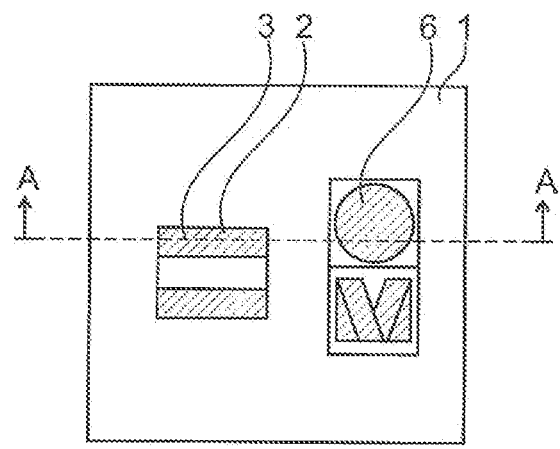
FIG. 1 a plan view of a decorated substrate.
Figure 2:
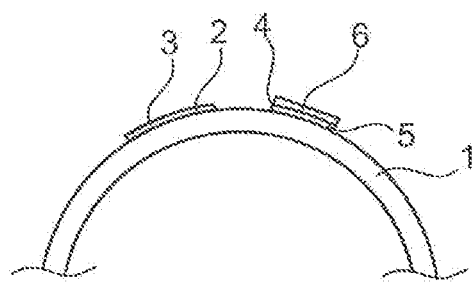
FIG. 2 a sectional view through the substrate along the section line A-A as per FIG. 1, and FIG. 3 a printing apparatus for implementing the decorating method of the invention.

FIGS. 1 and 2 show a decorated substrate 1 made of glass. This is a three-dimensional substrate, as for example a bottle or a beaker.

Printed on the substrate 1, more specifically on the surface of the substrate 1, is a first pattern 2 composed of a first printing ink composition 3. Also located on the substrate 1 adjacent to the first pattern 2 is a second pattern 4 composed of a second printing ink composition 5; both printing ink compositions, 3 and 5, are radiation-cured, in this case by means of UV mercury vapor lamps, doped mercury vapor lamps, or LED emitters.

As is evident from a joint viewing of FIGS. 1 and 2, located immediately above the second pattern 4 is a decorative coating 6 which is applied by hot stamping and which comprises a color-determining varnish layer and also, beneath it, an aluminum layer, which adheres to the second pattern 4 by way of a pressure-sensitive adhesive layer of the original hot stamping foil. The peripheral contour of the second pattern 4 is the same as that of the decorative coating 6.

The decorative coating 6 has been applied by hot stamping, specifically by means of a rotating stamping roll in a continuous roll-to-roll process, with the hot stamping foil having been pressed with pressure and temperature both against the first pattern 2 and against the second pattern 4 during hot stamping. Only in the region of the second pattern 4, however, has the decorative coating 6 parted from the backing foil, the hot stamping temperature and the stamping speed having been adjusted such that, on hot stamping, the second pattern, more specifically the UV-cured second printing ink composition 5, has heated to above its glass transition temperature, but not the first printing ink composition 3; the glass transition temperature of the UV-cured second printing ink composition is significantly lower than the glass transition temperature of the first UV-cured printing ink composition.

Figure 3:
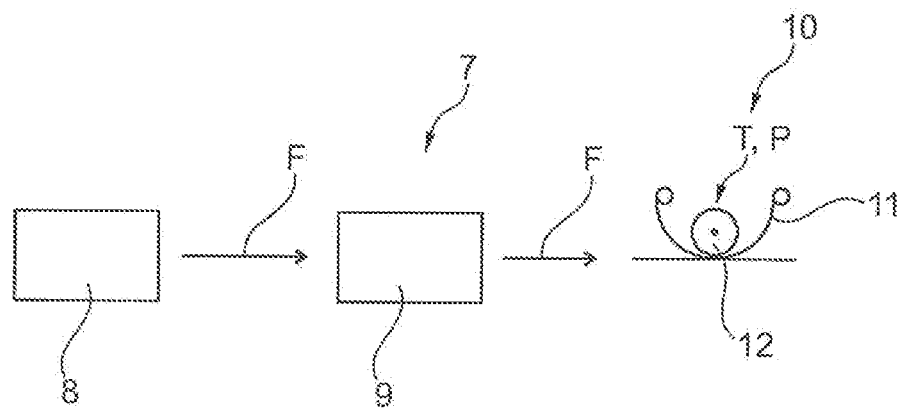

Shown in highly schematized form in FIG. 3 is an apparatus for decorating substrates. This apparatus comprises two combined printing and curing stations 8, 9, with one of the two stations allowing printing of the first pattern 2 and the other of the second pattern 4, the sequence being arbitrary in principle. It is nevertheless preferred for the second pattern 4 to be printed using the printing station which is positioned further downstream in the conveying direction. In the example, the stations in question are screen printing stations, although other printing processes can also be used.

In any case, during the decorating operation, the substrate moves in a conveying direction F. Following completion of both printed patterns and curing thereof, a hot stamping station 10 is reached, in the present case a roll-to-roll station, in which a hot stamping foil 11 is pressed areally against both patterns by means of a stamping tool 12, in the form of a stamping roll, under pressure and with exposure to temperature. In the region of the second pattern, which has a low glass transition temperature, the decorative coating detaches from a backing foil of the hot stamping foil, and bonds to or adheres to the second pattern, while the remaining backing foil is wound up again.

In the specific exemplary embodiment, the second printing ink composition comprises a mixture of a glass printing ink (75% to 90% by weight) as base composition, admixed with a pressure-sensitive adhesive (10% to 25% by weight) according to EP 1 806 327 B1—Kiwoprint UV 85 in the specific exemplary embodiment.

The invention claimed is:

1. A method for decorating substrates, comprising the following steps:
    printing at least one first decorative pattern (2) with a first printing ink composition (3) onto the substrate (1), the substrate being a glass vessel,
    printing at least one second decorative pattern (4) with a second printing ink composition (5) onto the substrate (1), at least sectionally in a region adjacent to the first pattern (2), temporarily before, after, or during the printing of the first pattern,
wherein the second printing ink composition (5) when radiation-cured, has a lower glass transition temperature than the first printing ink composition (3) when radiation-cured, and wherein a hot stamping method (10) is used to apply a decorative coating to the second pattern (4), for which purpose hot stamping foil comprising a decorative coating material is pressed with exposure to heat and pressure, by means of a stamping tool (12) against the printed substrate (1), at least sectionally in the region of the first and second patterns (4), so that the decorative coating adheres to the second pattern (4), but not to the first pattern (2),
    wherein the first and the second printing ink compositions (3, 5) are radiation-curable and wherein the first and second printing ink compositions (3, 5) are radiation-cured before the hot stamping method, and wherein the second printing ink composition (5) comprises a base composition having at least one radical photoinitiator and no cationic photoinitiator, and
wherein the base composition comprises at least one epoxy resin based on bisphenol A, which is in solution in a UV-curing monomer, and also a resin having functional groups which free functional hydroxy, epoxide, acid, acid anhydride and/or acrylate groups, and further a wax, and wherein on irradiation of the second printing ink composition (5), the epoxy resin based on bisphenol A is not crosslinked with the UV-curable monomer, but is instead merely physically embedded, and wherein a weight fraction of a heat-activatable pressure-sensitive adhesive in the second printing ink composition (5) is between 10% and 25%.

2. The method as claimed in claim 1, wherein the substrate to be printed is a drinking glass, perfume bottle, or a glass bottle and/or the first printing ink composition (3) is a first glass color or a first glass lacquer and the second printing ink composition (5) is a glass color or a glass lacquer, and wherein the heat-activatable pressure-sensitive adhesive is formed on the basis of UV-crosslinking polymers/monomers.

3. The method as claimed in claim 2, wherein the UV-crosslinking polymers/monomers are selected from the group consisting of polyurethane acrylates, polyacrylates, and monofunctional (meth) acrylate monomers.

4. The method as claimed in claim 1, wherein the substrate (1) to be printed is plastic tube or a plastic label, and/or wherein the heat-activatable pressure-sensitive adhesive is formed on the basis of UV-crosslinking polymers/monomers.

5. The method as claimed in claim 1, wherein the operating parameters of the hot stamping are selected such that the second printing ink composition (5) of the second pattern (4) is heated to a temperature, above its glass transition temperature, and the first printing ink composition (3) of the first pattern (2) is heated to a temperature below its glass transition temperature.

6. The method as claimed in claim 1, wherein the glass transition temperature of the second printing ink composition (5) is at least 10° C. lower than the glass transition temperature of the first printing ink composition (3).

7. The method as claimed in claim 6, wherein the glass transition temperature of the second printing ink composition (5) is at least 10° C. lower than the glass transition temperature of all of any further patterns not to be stamped with hot stamping foil.

8. The method as claimed in claim 1, wherein the first printing ink composition (3) and the second printing ink composition (5) before the hot stamping step are cured by irradiating.

9. The method as claimed in claim 8, wherein the first printing ink composition and the second printing ink composition before the hot stamping step are cured by irradiating by means of updoped or doped mercury vapor lamps or LED emitters, during or immediately after printing of the respective pattern or in a joint irradiation step.

10. The method as claimed in claim 1, wherein the glass transition temperature of the second printing ink composition (5) is adjusted by addition of the heat-activatable pressure-sensitive adhesive based on UV-crosslinking polymers/monomers to the base composition.

11. The method as claimed in claim 10, wherein the glass transition temperature of the second printing ink composition is adjusted directly before the printing procedure, and wherein the base composition is a glass printing ink, a plastic printing ink, or a paper or cardboard printing ink.

12. The method as claimed in claim 1, wherein the first and/or the second pattern (2, 4) are printed onto the substrate by means of screen printing, rotary screen printing, flexographic printing, and offset printing.

13. The method as claimed in claim 1, wherein the patterns (2, 4) are applied to the substrate (1) with an apparatus which has a first printing station for printing and preferably radiation-curing the first pattern (2), and a second printing station (5) for printing and preferably radiation-curing the second pattern (4), and also a hot stamping station downstream of the printing stations in a substrate conveying direction.

14. A decorated substrate decorated by a decorating method as claimed in claim 1, comprising a substrate, there being provided on the surface of the substrate a first decorative printed pattern composed of a radiation-cured printing ink composition and, at least sectionally adjacent to the first printed pattern, a hot-stamped decorative coating under which a second printed pattern having the same peripheral contour as the decorative coating and composed of a second radiation-cured printing ink composition, the glass transition temperature of the radiation-cured second printing ink composition being lower than the glass transition temperature of the radiation-cured first printing ink composition.

15. The substrate as claimed in claim 14, wherein the second printing ink composition (5) has the same color as the decorative coating, with the substrate (1) being transparent.

16. The method as claimed in claim 1, wherein the hot stamping method (10) is a roll-to-roll method, wherein the decorative coating material is pressed in a continuous roll-to-roll operation, and wherein the stamping tool is a rotating stamping roll.

17. The method as claimed in claim 1, wherein the first and the second printing ink compositions are UV-curable and are cured immediately after printing of the respective pattern.

18. A method for decorating substrates comprising the following steps:
   printing at least one first decorative pattern (2) with a first printing ink composition (3) onto the substrate (1), the substrate being a plastic,
   printing at least one second decorative pattern (4) with a second printing ink composition (5) onto the substrate (1), at least sectionally in a region adjacent to the first pattern (2), temporarily before, after, or during the printing of the first pattern,
wherein the second printing ink composition (5) when radiation-cured has a lower glass transition temperature than the first printing ink composition (3) when radiation-cured, and wherein a hot stamping method (10) is used to apply a decorative coating to the second pattern (4), for which purpose hot stamping foil comprising a decorative coating material is pressed with exposure to heat and pressure, by means of a stamping tool (12) against the printed substrate (1), at least sectionally in the region of the first and second patterns (4), so that the decorative coating adheres to the second pattern (4), but not to the first pattern (2),
wherein the first printing ink composition (3), formed as a plastic color or plastic lacquer, and the second printing ink composition (5), formed as a plastic color or plastic lacquer, are radiation-curable and wherein the first and second printing ink compositions (3, 5) are radiation-cured before the hot stamping method, and wherein a weight fraction of a heat-activatable pressure-sensitive adhesive in the second printing ink composition (5) is between 10% and 25%.

19. A method for decorating substrates, comprising the following steps:
   printing at least one first decorative pattern (2) with a first printing ink composition (3) onto the substrate (1), the substrate being paper or cardboard,
   printing at least one second decorative pattern (4) with a second printing ink composition (5) onto the substrate (1), at least sectionally in a region adjacent to the first pattern (2), temporarily before, after, or during the printing of the first pattern,
wherein the second printing ink composition (5) when radiation-cured has a lower glass transition temperature than the first printing ink composition (3) when radiation-cured, and wherein a hot stamping method (10) is used to apply a decorative coating to the second pattern (4), for which purpose hot stamping foil comprising a decorative coating material is pressed with exposure to heat and pressure, by means of a stamping tool (12) against the printed substrate (1), at least sectionally in the region of the first and second patterns (4), so that the decorative coating adheres to the second pattern (4), but not to the first pattern (2),
wherein the first printing ink composition (3), formed as a paper or cardboard printing ink or as a paper or cardboard print varnish, and the second printing ink composition (5), formed as a paper or cardboard printing ink or as a paper or cardboard print varnish, are radiation-curable and wherein the first and second printing ink compositions (3, 5), are radiation-cured before the hot stamping method, and wherein a weight fraction of a heat-activatable pressure-sensitive adhesive in the second printing ink composition (5) is between 10% and 25%.

20. The method as claimed in claim 19, wherein the substrate to be printed is a label or a folding box, and/or wherein the heat-activatable pressure-sensitive adhesive component is formed on the basis of UV-crosslinking polymers/monomers.

* * * * *